(12) United States Patent
Imai et al.

(10) Patent No.: US 8,443,055 B2
(45) Date of Patent: May 14, 2013

(54) SYSTEM AND METHOD TO PROVIDE DEVICE CONTROL SERVICE, AND COMPUTER PRODUCT

(75) Inventors: Yuji Imai, Kawasaki (JP); Satoshi Tsuchiya, Kawasaki (JP); Yutaka Ezaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1341 days.

(21) Appl. No.: 11/159,114

(22) Filed: Jun. 23, 2005

(65) Prior Publication Data

US 2006/0187857 A1 Aug. 24, 2006

(30) Foreign Application Priority Data

Feb. 18, 2005 (JP) ................................. 2005-043107

(51) Int. Cl.
*G06F 15/16* (2006.01)
(52) U.S. Cl.
USPC ........... 709/218; 709/217; 709/219; 709/228; 709/229; 340/1.1; 375/219; 700/90
(58) Field of Classification Search .................. 709/218, 709/217, 219, 228, 229; 726/1, 5; 700/90; 375/219; 340/1.1
See application file for complete search history.

(56) References Cited

U.S. PATENT DOCUMENTS

| | | | | |
|---|---|---|---|---|
| 5,506,961 | A * | 4/1996 | Carlson et al. ..................... 726/5 |
| 6,092,201 | A * | 7/2000 | Turnbull et al. ................... 726/4 |
| 6,792,323 | B2 * | 9/2004 | Krzyzanowski et al. ....... 700/90 |
| 7,353,281 | B2 * | 4/2008 | New et al. ...................... 709/229 |
| 7,646,230 | B2 * | 1/2010 | Parfitt ............................. 327/265 |
| 8,205,240 | B2 * | 6/2012 | Ansari et al. ...................... 726/1 |
| 8,229,755 | B2 * | 7/2012 | Felice .............................. 705/1.1 |
| 8,333,321 | B2 * | 12/2012 | Gressel et al. ................ 235/382 |
| 2003/0009760 | A1 | 1/2003 | Sakamoto et al. |
| 2003/0028653 | A1 * | 2/2003 | New et al. ...................... 709/229 |
| 2003/0158956 | A1 | 8/2003 | Tanaka et al. |
| 2003/0236748 | A1 * | 12/2003 | Gressel et al. .................. 705/41 |
| 2008/0191009 | A1 * | 8/2008 | Gressel et al. ................ 235/382 |
| 2010/0299718 | A1 * | 11/2010 | Roever et al. ..................... 726/1 |
| 2011/0035503 | A1 * | 2/2011 | Zaid et al. ..................... 709/228 |
| 2011/0145602 | A1 * | 6/2011 | Ginter et al. .................. 713/193 |
| 2012/0022902 | A1 * | 1/2012 | Gressel et al. ..................... 705/5 |
| 2012/0266209 | A1 * | 10/2012 | Gooding et al. .................. 726/1 |

FOREIGN PATENT DOCUMENTS

| | | |
|---|---|---|
| JP | 08-241281 | 9/1996 |
| JP | 2001-101054 | 4/2001 |
| JP | 2002-135862 | 5/2002 |

(Continued)

OTHER PUBLICATIONS

E. Rescorla RFC 2818- HTTP over TLS May 2000 Internet Engineering Task Force.*

(Continued)

*Primary Examiner* — Thu Ha Nguyen
(74) *Attorney, Agent, or Firm* — Fujitsu Patent Center

(57) ABSTRACT

A device control service providing system includes a service request receiving unit that receives, via a network, a device control service request for controlling a group of electronic devices, and a process execution requesting unit that requests respective device control servers to execute device control processes for controlling an operation of the electronic devices in the group based on the request received, where one of the device control servers executes the device control processes corresponding to one group of the electronic devices.

13 Claims, 11 Drawing Sheets

FOREIGN PATENT DOCUMENTS

| | | |
|---|---|---|
| JP | 2002-163235 | 6/2002 |
| JP | 2003-022224 A | 1/2003 |
| JP | 2003-308264 | 10/2003 |

OTHER PUBLICATIONS

RFC 2818 "HTTP over TLS" E. Rescorla RTFM, Inc. May 2000 (Previously Supplied).*

"Easy Connection of Home Appliances to the Internet. Development and Full-Scale Introduction of "KEBAB", Real-Time External Remote Control for Internet-Connected Home Appliances. Real-Time Control of In-Home Internet-Connected Home Appliances Using Mobile Devices", Matsushita Electric Industrial Co., Ltd., Oct. 1, 2003, <URL: http://panasonic.co.jp/corp/news/official.data/data.dir/jn031001-4/jn031001-4. html>.

"The aim of NTT communications' "Experiment for Connection Services for Internet-Connected home appliances,"" IT Media, Inc., Feb. 13, 2004, <URL: http://www.itmedia.co.jp/lifestvle/articles/0402/13/news093.html>.

Partial English Translation of Office Action, Jun. 3, 2008.

* cited by examiner

FIG. 4

| USER ID | USER NAME | ELECTRONIC DEVICE ID | DEVICE CATEGORY | OWNER | OPERATING AUTHORITY | CONDITIONS OF USAGE | ... |
|---|---|---|---|---|---|---|---|
| 10001 | USER A | XXX101 | HDD RECORDER | USER A | ◎ | INSTALLATION LOCATION (ROOM "XX1",STORAGE FILE (O × LECTURE ),.... | ⋮ |
| | | XXX201 | TELEVISION | USER A | ◎ | INSTALLATION LOCATION (ROOM "XX1"),.... | ⋮ |
| | | ... | ... | ... | ... | ... | ... |
| ... | ... | ... | ... | ... | ... | ... | ... |

FIG. 7

| ELECTRONIC DEVICE ID (SERIAL NUMBER) | DEVICE CATEGORY | MANU-FACTURER | DEVICE CAPABILITY | CONDITIONS OF USAGE | ... |
|---|---|---|---|---|---|
| XXX101 | HDD RECORDER | MANU-FACTURER E | "X × Y" PIXELS, .... | INSTALLATION LOCATION (ROOM "XX1"), STORAGE FILE (O×LECTURE, ....) .... | ... |
| ... | ... | ... | ... | ... | ... |

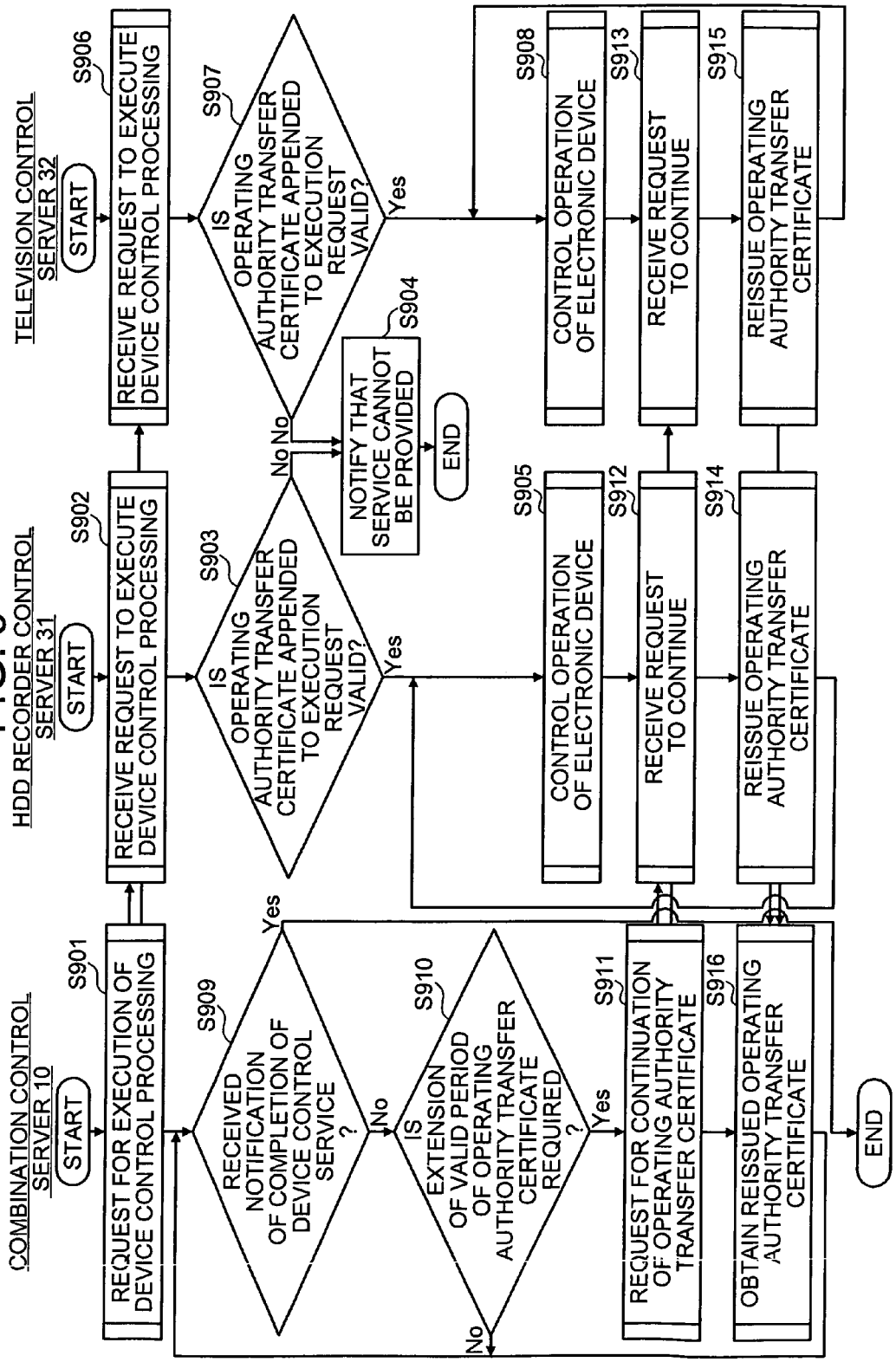

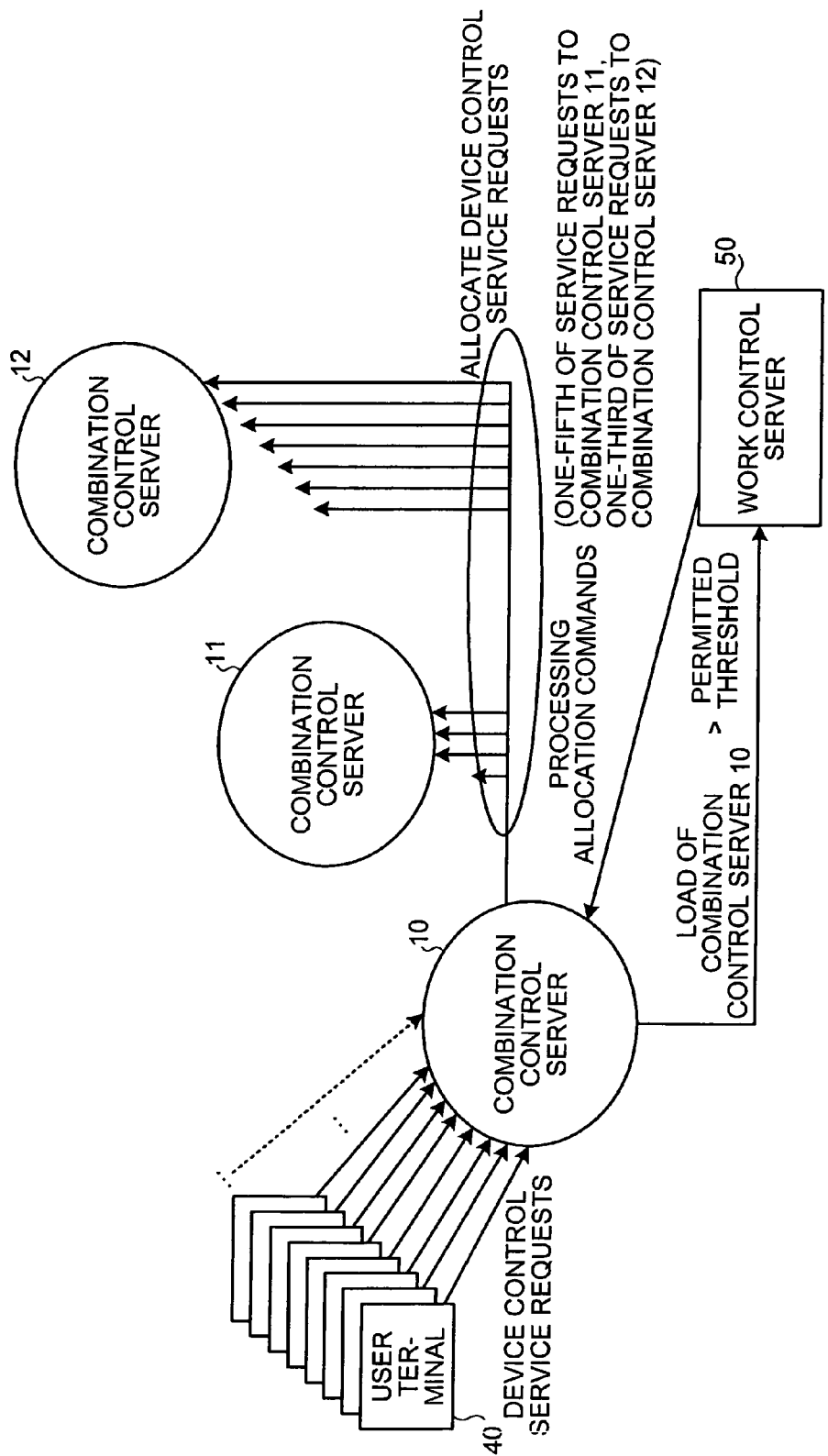

FIG.11

| USER ID | USER NAME | ELECTRONIC DEVICE ID | DEVICE CATEGORY | OWNER | OPERATING AUTHORITY | DEVICE USAGE CONDITIONS | NOTES |
|---|---|---|---|---|---|---|---|
| 10001 | USER A | XXX101 | HDD RECORDER | USER A | ◎ | INSTALLATION LOCATION (ROOM "XX1"), STORAGE FILE (O × LECTURE,...),... | ... |
| | | XXX201 | TELEVISION | USER A | ◎ | INSTALLATION LOCATION (ROOM "XX1"),... | ... |
| | | XXX102 | HDD RECORDER | USER B | △ | INSTALLATION LOCATION (ROOM "X10") STORAGE FILE (O × LECTURE,...),... | PERMISSION TO SUPPLY VIDEO SIGNAL OF O × LECTURE ONLY |
| | | XXX202 | TELEVISION | USER B | ○ | INSTALLATION LOCATION (ROOM "X10"),... | PERMISSION TO USE BETWEEN 9 A.M. AND 9 P.M. |
| | | ... | ... | ... | ... | ... | ... |
| 10002 | USER B | XXX102 | HDD RECORDER | USER B | ◎ | INSTALLATION LOCATION (ROOM "X10", STORAGE FILE (O × LECTURE,...),... | ... |
| | | XXX202 | TELEVISION | USER B | ◎ | INSTALLATION LOCATION (ROOM "X10"),... | ... |
| | | ... | ... | ... | ... | ... | ... |
| | ... | | | | | | |

SYSTEM AND METHOD TO PROVIDE DEVICE CONTROL SERVICE, AND COMPUTER PRODUCT

BACKGROUND OF THE INVENTION

1) Field of the Invention

The present invention relates to a system and a method to provide a device control service, and a computer product in which, a request to execute a device control process for an electronic device is sent to a device control server that performs the device control process for controlling operations of the electronic device.

2) Description of the Related Art

Conventionally, the rapid expansion of a ubiquitous network society is accompanied by an increasing need to operate audio and visual (AV) devices and security devices, and household electronic devices such as air-conditioners, from outside. In view of such needs, various techniques for controlling the operation of such electronic devices via a network such as the Internet have been developed in the field of ubiquitous network household electrical products.

For example, "Development and full-scale introduction of Real-time Outside-the-house control" for Internet Appliance "KEBAB", <URL:http://panasonic.co.jp/corp/news/official-.data/data.dir/jn031001-4.html> and "The aim of "Experiment for Internet Appliance Connection services" by NTT communications, <URL:http://www.itmedia.co.jp/lifestyle/articles/0402/13/news093.html> propose a device control service providing system in which security of a server apparatus is guaranteed by the manufacture at the time of delivery, and a coded virtual communication network is established between an electronic device to be controlled and the server apparatus, in an initial state such as when the power is turned on. All packets received from outside the virtual communication network are rejected. This prevents tampering of data in the electronic device, and unauthorized operation of the electronic device caused by an attack packet from a third party.

However, the conventional technique mentioned above can only control the operation of a single electronic device, and consequently, usability in the device control service is poor.

SUMMARY OF THE INVENTION

It is an object of the present invention to at least solve the problems in the conventional technology.

According to an aspect of the present invention, a device control service providing system includes a service request receiving unit that receives, via a network, a device control service request for controlling a group of electronic devices; and a process execution requesting unit that requests respective device control servers to execute device control processes for controlling an operation of the electronic devices in the group based on the request received, where one of the device control servers executes the device control processes corresponding to one group of the electronic devices.

According to another aspect of the invention, a method that provides device control service for controlling operation of electronic devices includes receiving, via a network, a device control service request for controlling a group of the electronic devices; and requesting respective device control servers to execute device control processes for controlling an operation of the electronic devices in the group based on the request received, where one of the device control servers executes the device control processes corresponding to one group of the electronic devices.

According to still another aspect of the present invention, a computer-readable recording medium stores therein a computer program that causes a computer to implement the above method.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is an example of information stored in an ownership management table;

FIG. 7 is an example configuration of information stored in a device management table;

FIG. 9 is a flowchart of a process procedure to request execution of a device control process;

FIG. 10 is an explanatory diagram of a modified embodiment of the present invention;

FIG. 11 is an explanatory diagram of still another embodiment with a modification of the ownership management table.

DETAILED DESCRIPTION

Exemplary embodiments of the present invention will be explained in detail below, with reference to the accompanying drawings.

Figure 1:
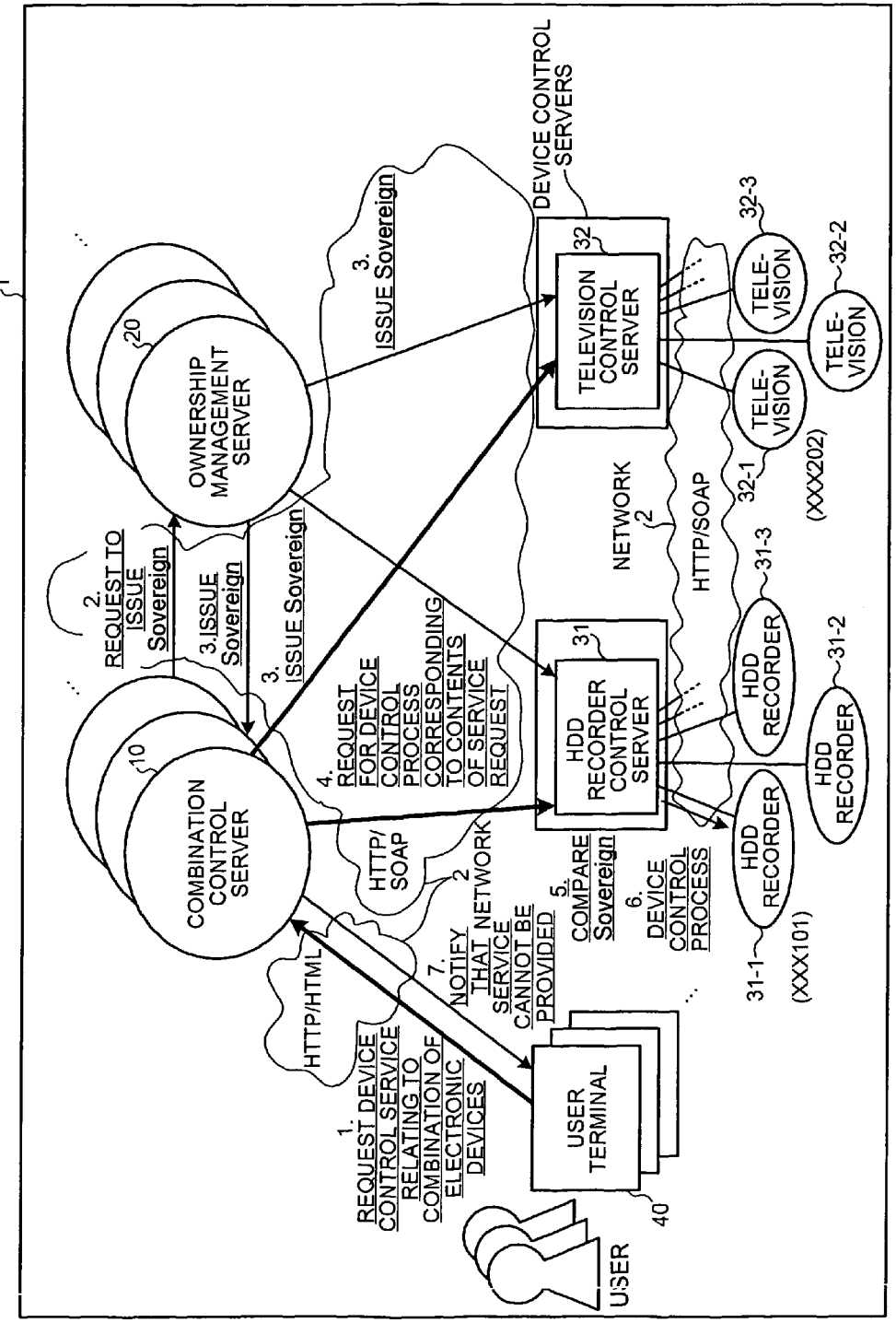
FIG. 1 illustrates a system configuration of a device control service providing system according to the present invention.

First, a summary and the features of the device control service providing system according to a first embodiment of the present invention will be explained. FIG. 1 illustrates a system configuration of the device control service providing system according to the present invention. A device control service providing system 1 receives a device control service request from a user terminal 40 via a network 2, and makes a request to respective device control servers 30 (e.g., a hard disk drive (HDD) recorder control server 31 and a television control server 32) to execute a device control process to control the operations of electronic devices (e.g., HDD recorders 31 and televisions 32).

The main feature of the device control service providing system 1 is the "process execution request process", whereby it receives a device control service request relating to a combination of electronic devices via the network 2, and makes a request to a device control server to execute the appropriate device control process. The device control server performs device control process corresponding to the combination of electronic devices, based on the request received. The "process execution request process" can improve usability in a device control service.

The main feature will be explained more specifically. A combination control server 10 in the device control service providing system 1 receives a device control service request relating to a combination of electronic devices from the user terminal 40 via the network 2, and makes a request to the respective device control servers 30 (e.g., the HDD recorder control server 31 and the television control server 32) to execute the device control process based on the contents of the service, thereby realizing a device control service that can operate a combination of electronic devices.

More specifically, to realize a device control service that can operate a combination of electronic devices, a communication network is transformed into a web service network. By establishing such a communication network, it becomes possible to link together the device control functions of the device control servers 30, serving as components, based on device control service requests from the user terminal 40, and operate them as applications.

In the example of the conventional technique, the device control service is limited to uniformly receiving device control service requests for controlling the operation of individual electronic devices. However, the present system receives a device control service request relating to a combination of electronic devices, and makes a request to the respective device control servers, to execute appropriate device control processes. Thus, a device control service that can operate a combination of electronic devices is realized, and the usability with respect to the device control service improves, as explained in the main feature.

The present invention has an additional feature that relates to the main feature. The device control service providing system 1 according to the present invention determines whether a device control service request received is from someone who has authority to operate the combination of the electronic devices. If it is determined that the service request is from someone who has operating authority for the combination of the electronic devices, the system permits execution of device control process corresponding to the combination of electronic devices, and sends a request to execute the appropriate device control process to the respective device control servers.

It is important for the device control service providing system 1 to improve its usability with respect to the device control service, and to maintain security of the electronic devices owned by users. Accordingly, an ownership management server 20 issues operating authority transfer certificates "Sovereign" to the device control servers 30 (e.g., the HDD recorder control server 31 and the television control server 32), and the combination control server 10 that executes the "process execution request process", and permits execution of the device control process only if their operating authority transfer certificates "Sovereign" match.

By permitting execution of the device control process corresponding to the combination of electronic devices only if there is a service request from someone who has operating authority for the electronic devices, it is possible to prevent the electronic devices from being operated against the intention of the owner, thereby maintaining security of the electronic devices owned by the users.

Related to this, by allowing joint operating authority of electronic devices within a range permitted by a plurality of owners, it is possible to realize a device control service that enables electronic devices of other owners to be operated in combination, thereby further improving usability with respect to the device control service. Even if a device control service request or a command to terminate operating authority of another user is received from an owner while persons with an operating authority are operating the electronic device, the owner can immediately recapture operating authority of the electronic device.

The ownership management server 20 restricts permission to execute device control process of the combination of electronic devices to a predetermined time period, or to predetermined devices to be processed, or both. Consequently, even when the server apparatus (the combination control server 10) that controls the combined operations of the device control servers stops, the server apparatus can be prevented from monopolizing the device control server and the electronic devices that are contained in the device control server.

Figure 2:
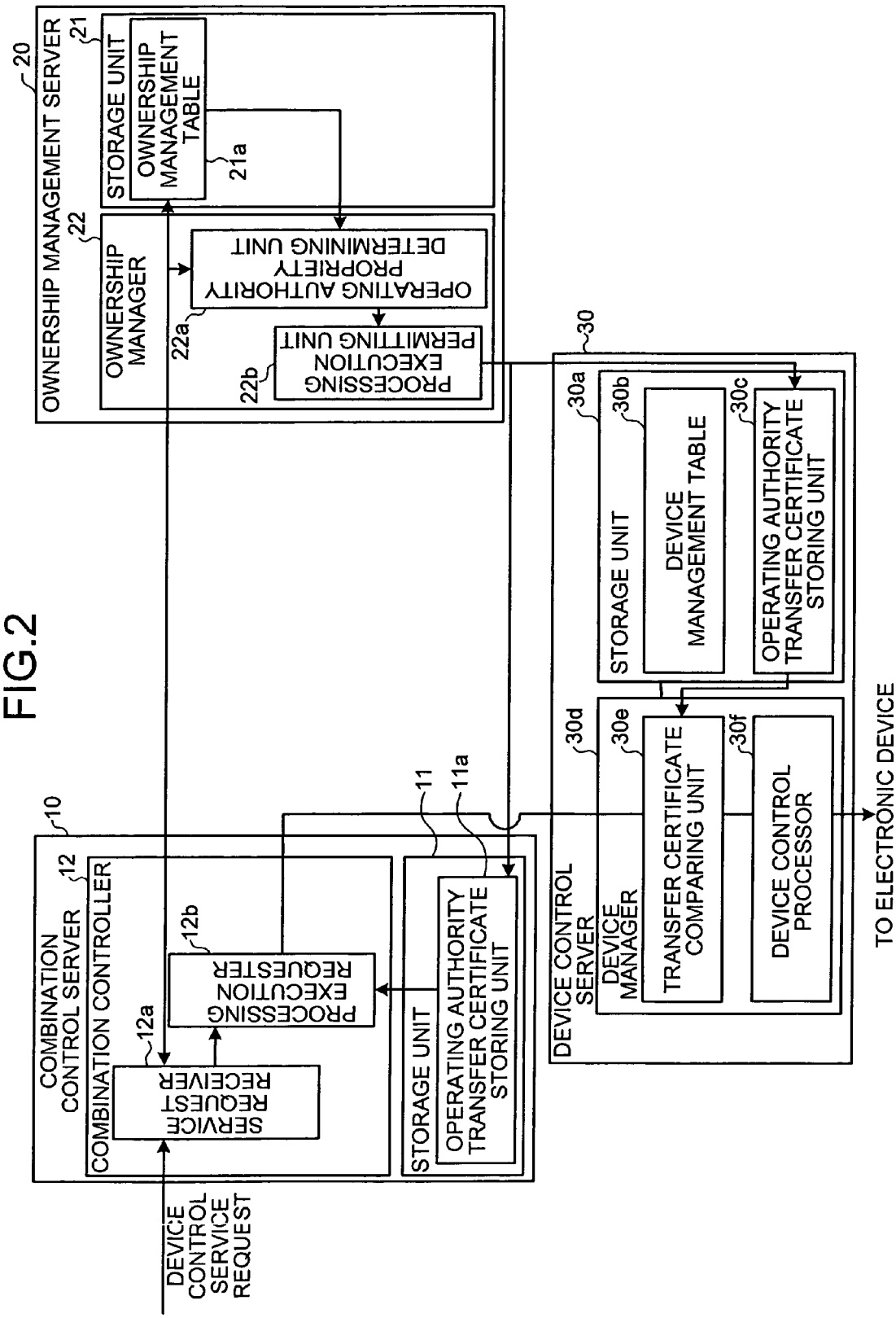
FIG. 2 illustrates configurations of a combination control server, an ownership management server, and a device control server according to a first embodiment.

The device control service providing system according to the first embodiment will be explained next FIG. 2 illustrates configurations of a combination control server, an ownership management server, and a device control server, according to the first embodiment. As shown in FIGS. 1 and 2, the device control service providing system 1 includes the combination control server 10, the ownership management server 20, and a device control server 30 (e.g., the HDD recorder control server 31 and the television control server 32), which are connected via the network 2 so that they can communicate with one another. The configuration of these servers will be explained hereinafter.

The combination control server 10 receives a device control request relating to a combination of electronic devices from the user terminal 40, and controls combination operations of device control servers such as the HDD recorder control server 31 and the television control server 32. The combination control server 10 includes a combination controller 12 and a storage unit 11.

The storage unit 11 stores data and programs required in various processes executed by the combination controller 12, and includes an operating authority transfer certificate storing unit 11a that stores operating authority transfer certificates "Sovereign", issued by a processing execution permitting unit 22b of the ownership management server 20, for each device control service.

The combination controller 12 includes an internal memory that stores control programs such as an operating system (OS), programs stipulating various process procedures and the like, and predetermined data, enabling the combination controller 12 to function as a processor that can execute various processes. The combination controller 12 further includes a service request receiver 12a and a processing execution requester 12b, which are particularly relevant to the present invention.

Figure 3:
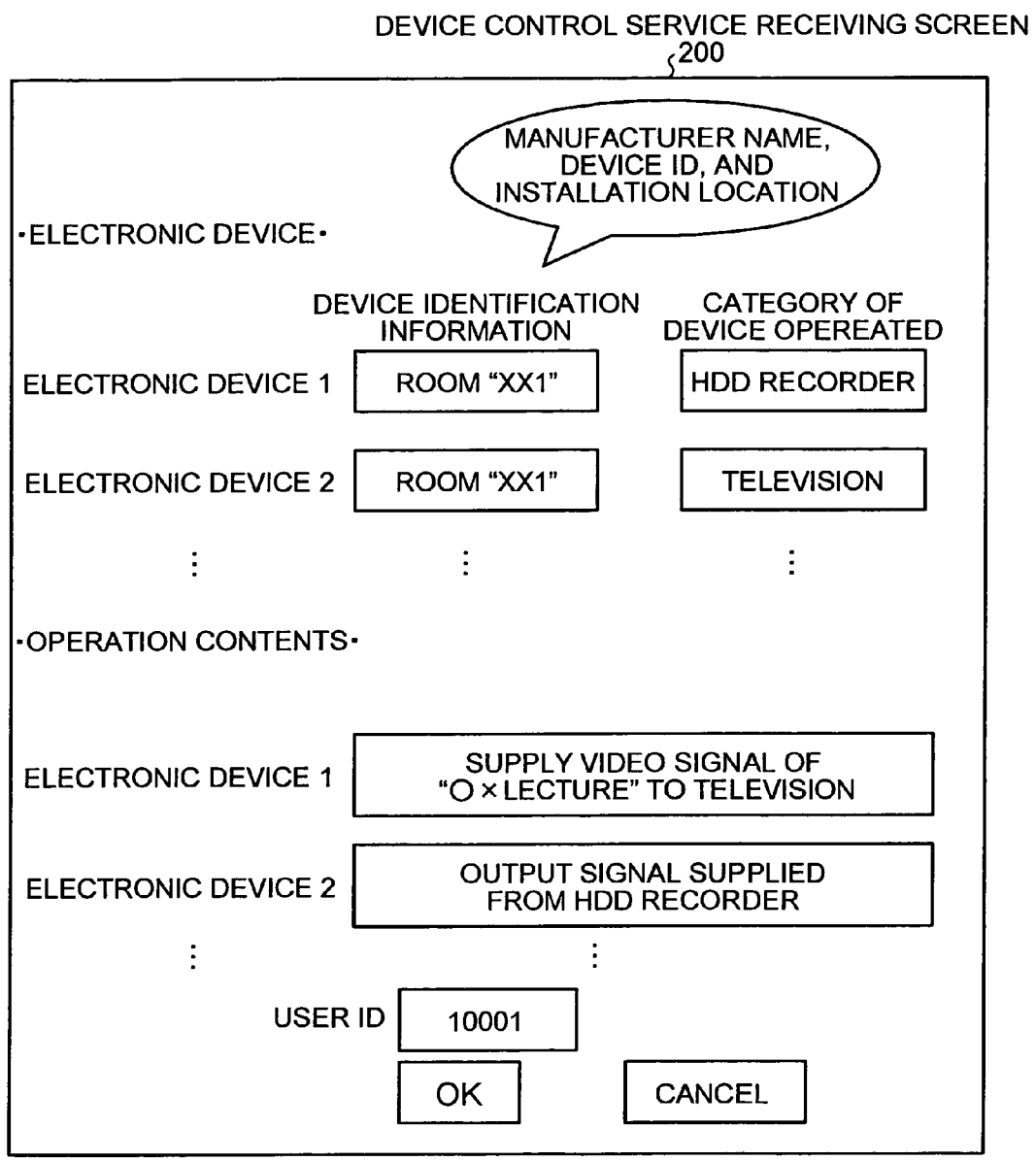
FIG. 3 is an example of a device control service receiving screen.

The service request receiver 12a receives a device control service request relating to a combination of electronic devices from the user terminal 40 via the network 2. For example, a device control service receiving screen 200 as shown in FIG. 3 is transmitted to the user terminal 40. User IDs, information for identifying the electronic devices forming the combination, contents of operations performed when combining and operating the electronic devices, and the like, are received into this device control service receiving screen 200. Information for identifying the electronic devices forming the combination is input as "category of devices operated" and "device identification information", such as names of manufacturers, device IDs (device serial numbers), and installation locations of the devices.

When the service request receiver 12a receives a device control service request, the combination controller 12 uses the "user ID" as a key to request for a list of electronic devices, for which the service requester has operating authority, from the ownership management server 20, and obtains the list of electronic devices from the ownership management server 20. For example, in the example shown in FIG. 3, the record of "user A" shown in FIG. 4 is obtained as a list of electronic devices.

The combination controller 12 refers to the list of electronic devices, and based on information for identifying the electronic devices forming the combination (i.e., information such as "category of devices operated" and "device identification information", such as names of manufacturers, electronic device IDs, and installation locations of devices), identifies the electronic devices that form the combination.

For example, in the example shown in FIG. 3, the installation location of both electronic devices is "xx1" and the categories of devices operated are "HDD recorder" and "television". Therefore, the combination controller 12 identifies an HDD recorder 31-1 (device ID:

xxx101) and a television 32-1 (device ID: xxx201), as an "electronic device 1" and an "electronic device 2" from the obtained list of electronic devices.

The combination controller 12 then determines whether the service target owns the electronic devices of this combination. The "service target" refers to the service requester, or the owner of the electronic devices if use of an electronic device not owned by the service requester is specified.

If it is determined that the service target does not own the electronic devices of the combination, the combination controller 12 notifies the user terminal 40 that this device control service cannot be provided. If it is determined that the service target owns the electronic devices of the combination, the combination controller 12 makes a request to the ownership management server 20 to issue an operating authority transfer certificate "Sovereign".

For sake of convenience, the ownership management server 20 that issues the operating authority transfer certificate "Sovereign" will be explained first. The ownership management server 20 manages ownership of electronic devices contained in the device control servers 30 such as the HDD recorder control server 31 and the television control server 32, and includes a storage unit 21 and an ownership manager 22.

The storage unit 21 stores data and programs required in various processes executed by the ownership manager 22, and includes an ownership management table 21a. The ownership management table 21a is used for managing the ownership of electronic devices contained in the device control server 30. Specifically, as shown in FIG. 4, the ownership management table 21a stores electronic device IDs, device categories, device owners, device operating authority, and device usage conditions, corresponding to each user.

The ownership manager 22 includes an internal memory that stores control programs such as an operating system (OS), programs stipulating various process procedures and the like, and predetermined data, enabling the ownership manager 22 to function as a processor that can execute various processes. The ownership manager 22 further includes an operating authority propriety determining unit 22a, and a processing execution permitting unit 22b that are particularly relevant to the present invention.

The operating authority propriety determining unit 22a determines whether a device control service request, received by the service request receiver 12a in the combination control server 10, is from someone who has operating authority for the electronic devices in this combination.

More specifically, the operating authority propriety determining unit 22a refers to the ownership management table 21a to determine whether the service requester has operating authority for the electronic devices that form the combination. For example, in the example shown in FIG. 3, the operating authority propriety determining unit 22a checks the operating authority field in the ownership management table 21a, and determines whether a "user A" has respective operating authorities for the HDD recorder 31-1 (device ID: xxx101) and the television 32-1 (device ID: xxx201) that form the combination.

The processing execution permitting unit 22b permits execution of device control process with respect to the combination of the electronic devices, if the operating authority propriety determining unit 22a determines that the service request is from someone who has operating authority for the electronic devices forming the combination.

Figure 5:
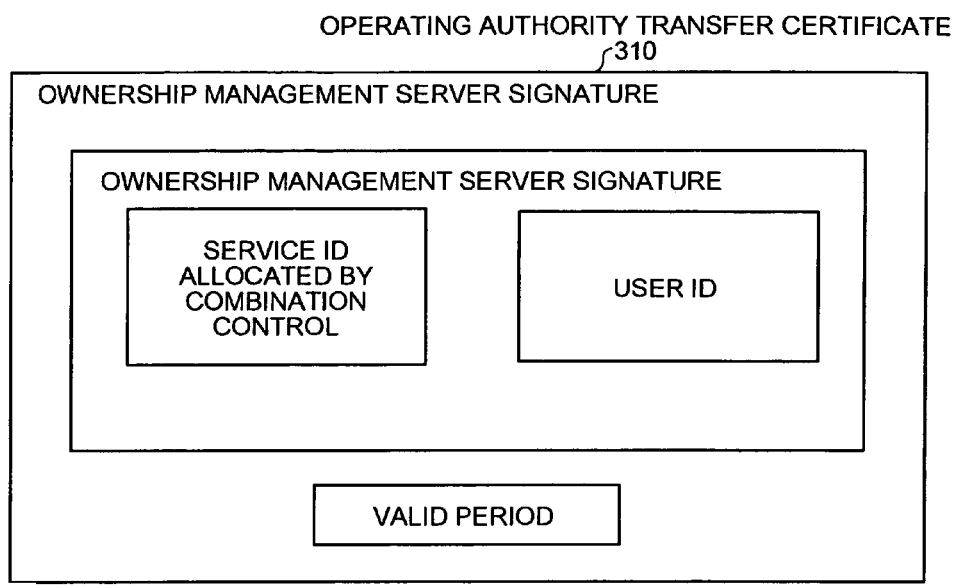
FIG. 5 is an example of an operating authority transfer certificate.

Specifically, when the service requester has operating authority for the electronic devices forming the combination, i.e., the HDD recorder 31-1 (device ID: xxx101) and the television 32-1 (device ID: xxx201), the processing execution permitting unit 22b issues operating authority transfer certificates "Sovereign" 310 as shown in FIG. 5, for each of the combination control server 10, the HDD recorder control server 31, and the television control server 32.

As shown in FIG. 5, the processing execution permitting unit 22b signs the name of the ownership management server 20 in the "service ID" and the "user ID" of the device control service request allocated by the combination control server 10. The valid period of the operating authority transfer certificate "Sovereign" is set according to this signature data, and the signature of the ownership management server 20 is signed in signature data having a set valid period, to issue the operating authority transfer certificate "Sovereign".

The name of the ownership management server 20 is signed to prevent operating authority transfer certificates "Sovereign" from being granted to server apparatuses (the combination control servers) other than the combination control server 10.

By setting the valid period at the time of issuing an operating authority transfer certificate "Sovereign", even if the server apparatus (the combination control server 10) that controls the combined operation of the device control servers stops, the combination control server 10 can be prevented from monopolizing the device control servers and the electronic devices contained in the device control servers.

The valid period of the operating authority transfer certificate "Sovereign" can be extended by each device control server when device control process must be extended in order to perform the device control service. In this case, the combination control server 10 and the device control server 30 store identical operating authority transfer certificates "Sovereign".

Returning to the explanation of the combination control server 10, the processing execution requester 12b sends a request for execution of the appropriate device control process to the device control server 30 that performs the device control process for the combination of electronic devices based on the request received by the service request receiver 12a, when the processing execution permitting unit 22b issues the operating authority transfer certificate "Sovereign".

For example, in the example shown in FIG. 3, when operating the combination of electronic devices received by the service request receiver 12a, the operation contents (i.e., "electronic device 1": supply video signal of "ox lecture" to the television 32-1, and "electronic device 2": output signal supplied from the HDD recorder 31-1) are converted to commands written in Extensible Markup Language (XML), and requests for device control process are made respectively to the HDD recorder control server 31 and the television control server 32.

The device control server 30 (the HDD recorder control server 31 and the television control server 32) that performs device control process will be explained next. In the "process execution request process" of the present invention, with the exception of "device control process" that closely relates to the operation contents of the electronic devices, the HDD recorder control server 31 and the television control server 32 perform the same process, and therefore, these will be explained as the configuration of the device control server 30.

The device control server 30 receives a request to execute device control process from the combination control server, and controls the operations of the electronic devices. In the first embodiment, the device control server 30 controls electronic devices belonging to the same device category.

A storage unit 30a stores data and programs that are required in various processes executed by a device manager 30d, and includes a device management table 30b, and an operating authority transfer certificate storing unit 30c.

The device management table 30b stores management information relating to electronic devices. Specifically, as shown in FIG. 7, the device management table 30b stores, for each device ID (serial number), a device category, manufacturer, device capability, and device usage conditions. For example, for a device ID "×××101", the device category is "HDD recorder", the manufacturer is "manufacture E", device capability is "X×Y" pixels . . . , and device usage conditions are "installation location: room "××1", stored file: "○× lecture", . . . ".

The operating authority transfer certificate storing unit 30c stores an operating authority transfer certificate "Sovereign", issued by the processing execution permitting unit 22b of the ownership management server 20, for each "service ID" issued by the combination control server 10.

The device manager 30d has an internal memory that stores control programs such as an operating system (OS), programs stipulating various process procedures and the like, and predetermined data, enabling the device manager 30d to function as a processor that can execute various processes. The device manager 30d further includes a transfer certificate comparing unit 30e, and a device control processor 30f, which are particularly relevant to the present invention.

The transfer certificate comparing unit 30e compares the operating authority transfer certificate "Sovereign" received with the execution request for device control process from the combination control server 10, and the operating authority transfer certificate "Sovereign" stored in the operating authority transfer certificate storing unit 30c.

The device control processor 30f performs "device control process", according to the commands written in XML received from the processing execution requester 12b, if the transfer certificate comparing unit 30e determines that both operating authority transfer certificates "Sovereign" match.

For example, the HDD recorder control server 31 performs the device control process of supplying a video signal of "○× lecture" to the television 32-1, as listed for HDD, and the television control server 32 performs the device control process of outputting the signal from the HDD recorder 31-1.

When the "device control process" is complete, the device control server 30 (the HDD recorder control server 31 and the television control server 32) sends a "completion notification" to the combination control server 10. When the valid period of the operating authority transfer certificate "Sovereign" expires, the device control server 30 discards the operating authority transfer certificate "Sovereign", and invalidates the operating authority transfer certificate "Sovereign" stored in the combination control server 10.

Returning to the explanation of the combination control server 10, the processing execution requester 12b monitors the valid period of the operating authority transfer certificate "Sovereign" until a notification that the device control process is complete is received from the device control server 30.

If the device control process related to the device control service request is not completed within the valid period of the operating authority transfer certificate "Sovereign", the processing execution requester 12b requests an extension of the valid period of the operating authority transfer certificate "Sovereign" to the HDD recorder control server 31 and the television control server 32.

The HDD recorder control server 31 and the television control server 32 receive the requests to extend the valid periods of the operating authority transfer certificates "Sovereign" from the processing execution requester 12b, and reissue operating authority transfer certificates "Sovereign" with extended valid periods.

Figure 6:
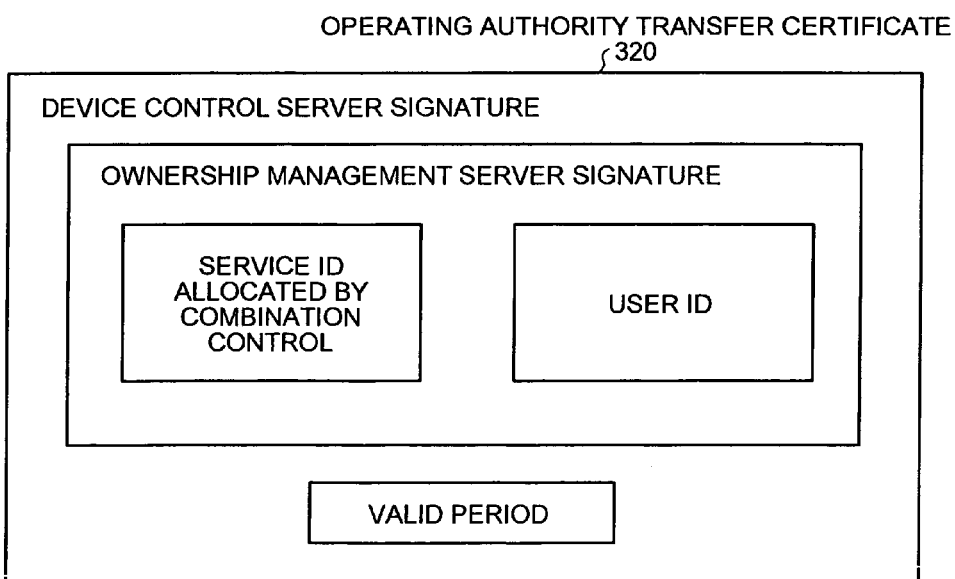
FIG. 6 is another example of the operating authority transfer certificate.

In this case, as shown in FIG. 6, a new valid period is appended to the signature data signed by the ownership management server 20 in the "service ID" and the "user ID" allocated by the combination control server 10, and an operating authority transfer certificate "Sovereign" 320 having signature data with a newly appended valid period, and that is signed by the device control server 30, is issued.

Upon receiving notification that the device control process is complete from the device control server 30, the processing execution requester 12b notifies the user terminal 40 that the device control service is complete, and the process ends.

Various process procedures of the device control service providing system according to the first embodiment will be explained next. (1) "Issuing of operating authority transfer certificate", which is performed before the "process execution request process" that is the main feature, will be explained first, followed by an explanation of (2) "process execution request process", the main feature.

(1) Issuing of Operating Authority Transfer Certificate

Figure 8:
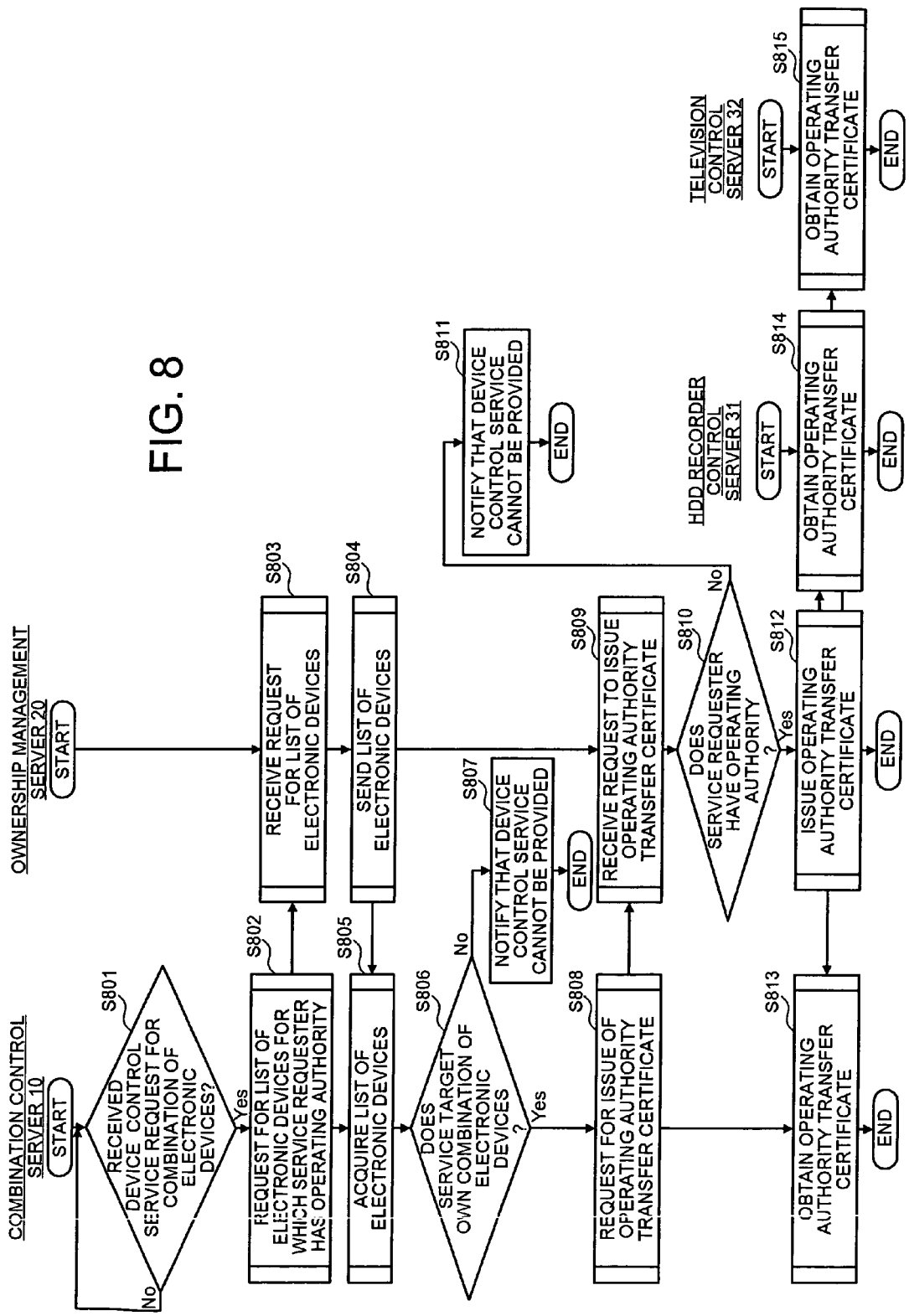
FIG. 8 is a flowchart of a process procedure for issuing the operating authority transfer certificate.

FIG. 8 is a flowchart of a process procedure for issuing an operating authority transfer certificate. The process for issuing operating authority transfer certificate starts when the service request receiver 12a receives a device control service request relating to a combination of electronic devices from the user terminal 40 via the network 2.

As shown in FIG. 8, when the service request receiver 12a receives the device control service receiving screen 200 into which user IDs, information for identifying the electronic devices that form the combination, contents of operations when operating the combination of electronic devices, and the like, are input (Yes at step S801), the combination controller 12 uses the "user ID" as a key to request for a list of electronic devices for which the service requester has operating authority, from the ownership management server 20 (step S802).

The ownership manager 22 in the ownership management server 20 receives the request for the list of electronic devices (step S803), and sends the list of electronic devices to the combination control server 10 (step S804). The combination controller 12 receives this reply, and acquires the list of electronic devices from the ownership management server 20 (step S805). For example, in the example shown in FIG. 3, the record of the "user A" shown in FIG. 4 is acquired as the list of electronic devices.

The combination controller 12 refers to the list of electronic devices, identifies the electronic devices that form the combination based on information for identifying the electronic devices forming the combination (i.e., information such as "categories of devices operated" and "device identification information", such as names of manufacturers, electronic device IDs, and installation locations of the devices), and determines whether the service target owns the electronic devices in the combination (step S806).

If the combination controller 12 determines that the service target does not own the electronic devices in the combination (No at step S806), it notifies the user terminal 40 that the device control service cannot be provided (step S807), and ends the process.

If the combination controller 12 determines that the service target owns the electronic devices in the combination (Yes at step S806), it sends a request to the ownership management server 20 to issue an operating authority transfer certificate "Sovereign" (step S808).

When the ownership management server 20 receives this request to issue the operating authority transfer certificate "Sovereign" (step S809), the operating authority propriety determining unit 22a refers to the ownership management table 21a (step S810) to determine whether the service requester has operating authority for the electronic devices that form the combination.

For example, in the example shown in FIG. 3, the operating authority propriety determining unit 22a refers to the operating authority fields in the ownership management table 21a that correspond to the HDD recorder 31-1 (device ID: xxx101) and the television 32-1 (device ID: xxx201) that form the combination, and determines whether the "user A" has operating authority.

If the operating authority propriety determining unit 22a determines that the service requester does not have operating authority for the electronic devices that form the combination, i.e., the HDD recorder 31-1 (device ID: xxx101) and the television 32-1 (device ID: xxx201) (No at step S810), the processing execution permitting unit 22b notifies the user terminal 40 that the device control service cannot be provided (step S811), and ends the process.

On the other hand, if the operating authority propriety determining unit 22a determines that the service requester has operating authority for the electronic devices that form the combination (Yes at step S810), the processing execution permitting unit 22b issues the operating authority transfer certificate "Sovereign" 310 shown in FIG. 5 for each of the combination control server 10, the HDD recorder control server 31, and the television control server 32 (step S812).

Thus, the combination control server 10, the HDD recorder control server 31, and the television control server 32 each obtain the operating authority transfer certificate "Sovereign" 310 (steps S813, S814, and S815).

(2) Process Execution Request Process

FIG. 9 is a flowchart of a process procedure to request execution of a device control process. The "process execution request process" starts when the processing execution permitting unit 22b issues an operating authority transfer certificate "Sovereign".

As shown in FIG. 9, when the processing execution permitting unit 22b issues the operating authority transfer certificate "Sovereign" (step S901), the processing execution requester 12b sends a request to execute the appropriate device control process to each of the device control servers 30 that perform device control process corresponding to the combination of electronic devices received by the service request receiver 12a (steps S902 and S906).

For example, in the example shown in FIG. 3, the operation contents when operating the combination of electronic devices received by the service request receiver 12a (i.e., "electronic device 1": supply video signal of "ox lecture" to the television 32-1 and "electronic device 2": output signal supplied from the HDD recorder 31-1) are converted to commands written in XML, and requests for device control process are made respectively to the HDD recorder control server 31 and the television control server 32.

The transfer certificate comparing unit 30e of the device control server 30 receives the request to execute device control process (steps S902 and S906), and compares the operating authority transfer certificate "Sovereign" received with the request to execute device control process from the combination control server 10, and the operating authority transfer certificate "Sovereign" stored in the operating authority transfer certificate storing unit 30c (steps S903 and S907).

If the transfer certificate comparing unit 30e determines that the operating authority transfer certificates "Sovereign" do not match (No at step S903, or No at step S907), the device manager 30d notifies the user terminal 40 that the device control service cannot be provided (step S904) and the process ends.

On the other hand, if the transfer certificate comparing unit 30e determines that the operating authority transfer certificates "Sovereign" match (Yes at step S903, and Yes at step S907), the device control processor 30f performs "device control process" according to the XML commands received from the processing execution requester 12b (steps S905 and S908).

For example, the HDD recorder control server 31 performs "device control process" to supply the video signal of "ox lecture" to the television 32-1, and the television control server 32 performs "device control process" to output the signal supplied from the HDD recorder 31-1.

The processing execution requester 12b monitors the valid period of the operating authority transfer certificate "Sovereign" (step S910) until it receives notification from the device control server 30 that the device control process is complete (Yes at step S909).

If the device control process related to the device control service request is not completed within the valid period of the operating authority transfer certificate "Sovereign" (Yes at step S910), the processing execution requester 12b requests the HDD recorder control server 31 and the television control server 32 for extension of the valid period of the operating authority transfer certificates "Sovereign" (step S911).

The HDD recorder control server 31 and the television control server 32 receive the request to extend the valid periods of the operating authority transfer certificates "Sovereign" from the processing execution requester 12b (steps S912 and S913), and reissue operating authority transfer certificates "Sovereign" with extended valid periods (steps S914 and S915).

The processing execution requester 12b obtains the operating authority transfer certificates "Sovereign" having extended valid periods from the HDD recorder control server 31 and the television control server 32 (step S916), and repeats the steps S910 to S916 until it receives notification from the device control server 30 that the device control process is complete (Yes at step S909).

Upon receiving notification from the device control server 30 that the device control process is complete (Yes at step S909), the processing execution requester 12b notifies the user terminal 40 that the device control service is complete, and ends the process.

As described above, the device control service providing system 1 according to the first embodiment can realize a device control service to operate a plurality of electronic devices in combination, with improved usability.

The device control service providing system 1 according to the first embodiment can also prevent the electronic devices from being operated against the intention of the owners, thereby maintaining the security of the electronic devices owned by the users.

Figure 12:
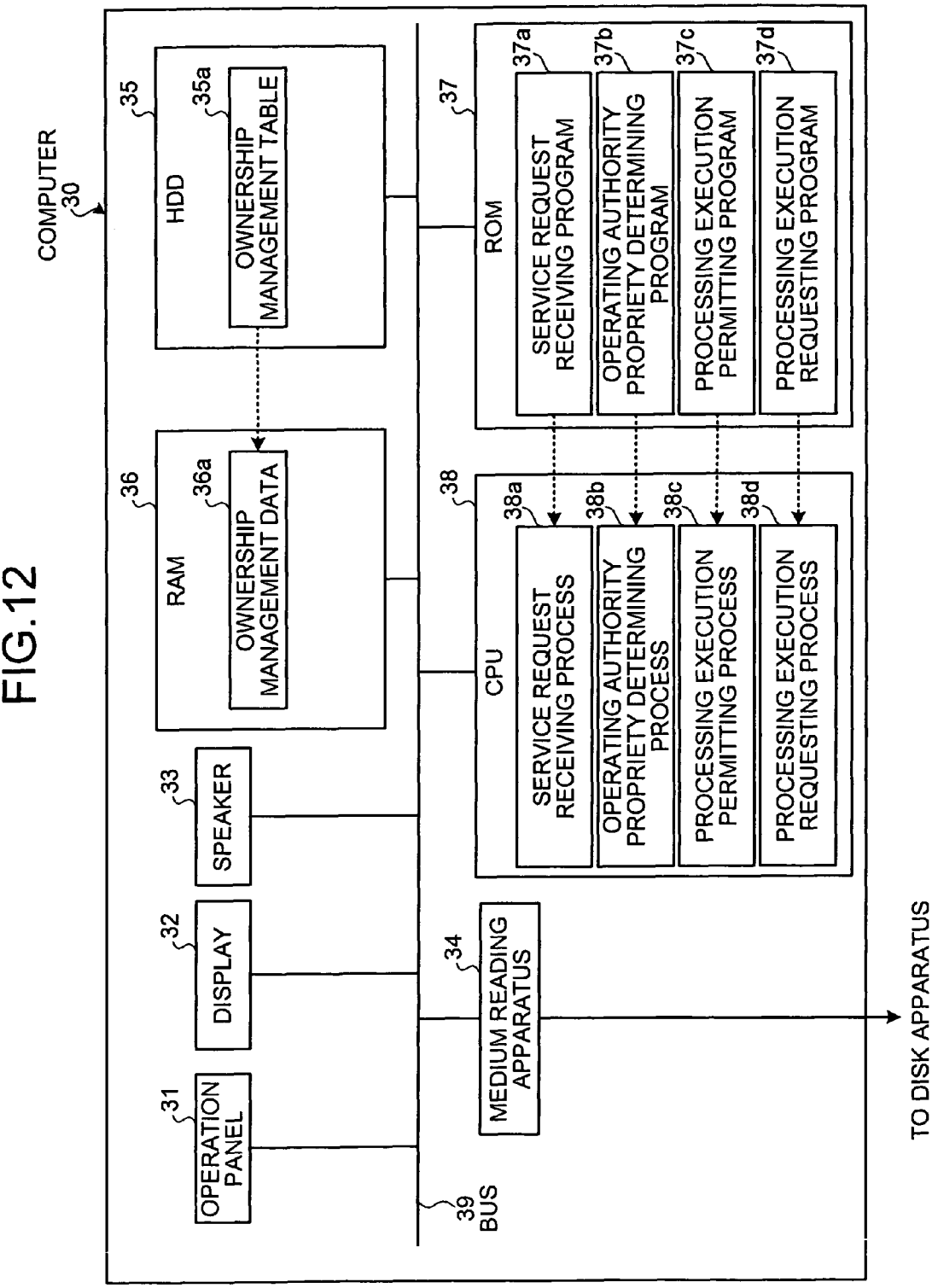
FIG. 12 illustrates a computer that executes device control service providing programs.

The various processes explained in the first embodiment can be realized by making a computer execute a program prepared in advance. Accordingly, one example of a computer that executes a device control service providing program having similar functions to those of the first embodiment will be explained next as a second embodiment, with reference to FIG. 12. FIG. 12 illustrates a computer that executes device control service providing programs.

As shown in FIG. 12, a computer 30 serving as a device control providing system includes an operation panel 31, a display 32, a speaker 33, a medium reading apparatus 34, an HDD 35, a random access memory (RAM) 36, a read only memory (ROM) 37, and a central processing unit (CPU) 38, all of which, are connected by a bus 39.

Device control service providing programs having similar functions to those of the first embodiment (i.e., a service request receiving program 37a, an operating authority propriety determining program 37b, a processing execution permitting program 37c, and a processing execution requesting program 37d) are stored in the ROM 37 in advance. Similar to the elements that form the combination control server 10 and the ownership management server 20 shown in FIG. 2, the programs 37a to 37d may be integrated or dispersed appropriately.

The CPU 38 reads and executes the programs 37a to 37d from the ROM 37, whereby the programs function as a service request receiving process 38a, an operating authority propriety determining process 38b, a processing execution permitting process 38c, and a processing execution requesting process 38d. The processes 38a to 38d respectively correspond to the service request receiver 12a, the operating authority propriety determining unit 22a, the processing execution permitting unit 22b, and the processing execution requester 12b shown in FIG. 2.

As shown in FIG. 12, the HDD 35 includes an ownership management table 35a, which corresponds to the ownership management table 21a shown in FIG. 2. Based on the combination of electronic devices requested as a device control service, and the ownership management data stored in the ownership management table 35a, the CPU 38 determines whether the service requester has operating authority. When it is determined that the service requester has operating authority for the electronic devices, the CPU 38 requests the device control server for permission to execute a device control process, and for the device control process.

The programs 37a to 37d may not be stored in the ROM 37 from the start. For example, the programs may be stored in a portable physical medium inserted into the computer 30, such as a flexible disk (FD), a CD-ROM, an magneto optical (MO) disk, a digital versatile disk (DVD), and an integrated circuit (IC) card, or a fixed physical medium such as an HDD provided inside or outside the computer 30, or another computer (or server) connected to the computer 30 via a public circuit, the Internet, a local area network (LAN), a wide area network (WAN), or the like. The programs are then read and executed by the computer 30.

While embodiments of the present invention have been explained so far, apart from the first and the second embodiments, various modified embodiments are possible within the technical scope of the invention described in the appended claims.

For example, according to the present invention, the processes of receiving the device control service request relating to the combination of electronic devices, or requesting execution of the device control process, which have similar functions to those of the service request receiver 12a and the processing execution requester 12b, may be allocated based on the loads of the server apparatuses (the combination control servers 10, 11, . . . ).

The combination control servers are used as part of the daily activities or the office work of the service users, and hence, the system must be configured to cope with severe fluctuations in the loads of the server apparatuses between normal times and peak times.

Accordingly, as shown in FIG. 10, in the device control service providing system according to the present invention, a work control server 50 may unitarily manage the loads of the combination control servers 10, 11, 12, . . . n, and if the load of the server apparatus exceeds a permissible threshold, the work control server 50 allocates the device control service request to another server apparatus. For example, when "server apparatus load">"permissible threshold" is detected in the combination control server 10, device control service requests in the overload portion in the combination control server 10 are allocated according to the load of another server apparatus.

Thus, this device control service providing system allocates the processes of receiving the device control service request relating to the combination of electronic devices and requesting execution of device control process, which have similar functions to those of the service request receiver 12a and the processing execution requester 12b, according to the loads of server apparatuses (the combination control servers 10, 11, . . . ). Consequently, a device control service can be realized on a grid that allows dynamic addition/reduction of resources, and wide-area center solidarity for continuous operation, thereby greatly improving scalability even in a large-scale system.

Thus, by realizing a device control service on a grid that allows dynamic addition/reduction of resources and wide-area center solidarity for continuous operation, highly reliable device control service can be provided to the users.

While in the first embodiment, device control service requests are made with respect to electronic devices owned by users themselves, the present invention is not limited to this. By communizing the operating authorities of electronic devices within ranges permitted by a plurality of owners, the electronic devices can be operated in combination with electronic devices of other owners.

For example, if the ownership of the electronic devices is set as in the ownership management table 21a shown in FIG. 11, it is possible to provide an expanded device control service that not only supplies a video signal from the HDD recorder 31-1 of the "user A" to the television 32-2 and outputs a signal supplied from the HDD recorder 31-1 to the television 32-1, but also supplies a video signal from an HDD recorder 31-2 of a "user B" to the television 32-2 and outputs a signal supplied from the HDD recorder 31-2 to the television 32-2.

By communizing the operating authorities of the electronic devices within ranges permitted by a plurality of owners, it is possible to realize a device control service that can operate them in combination with electronic devices of other owners, thereby further improving the usability in the device control service. In relation to this, if owners of electronic devices append operating authority of the electronic devices to other users in stages, operating authority of electronic devices can be appended according to personal characteristics of each user.

When the owner of an electronic device makes a device control service request or a command to terminate the operating authority of another user while someone who has been granted operating authority is operating the electronic device, the owner can immediately recapture the operating authority of the electronic device.

Although the combination control servers and the ownership management servers are dispersed in the first embodiment, the present invention is not limited to this. The combination control servers and ownership management servers themselves, or their functional parts may be dispersed or integrated.

Although the electronic devices of the same device category are accommodated in an external server apparatus (device control server) in the first embodiment, the present invention is not limited to this. The present invention can be similarly applied when the electronic devices are provided for each predetermined unit of device control servers (e.g., a household or a room), or in a system where the electronic devices and device control servers are connected by a LAN.

Of the various processes explained in the embodiments, all or a part of the processes explained as being performed automatically may be performed manually, or all or a part of the processes explained as being performed manually may be performed automatically by a known method. The information including the process procedure, the control procedure, specific names, and various kinds of data and parameters shown in the data or in the drawing can be optionally changed, unless otherwise specified.

The respective constituents of the illustrated apparatus are functionally conceptual, and physically identical configuration is not always necessary. In other words, the specific mode of dispersion and integration of the apparatus is not limited to the illustrated one, and all or a part thereof may be functionally or physically dispersed or integrated in an optional unit, based on the various kinds of load and the status of use.

According to the present invention, it is possible to realize a device control service that can operate a plurality of electronic devices in combination, thereby improving usability in the device control service.

According to the present invention, it is possible to link the device control functions of the device control servers serving as components, and to operate them as applications.

According to the present invention, the electronic devices are protected from being operated against the intention of the owners, and security of the electronic devices owned by the users is maintained.

According to the present invention, even if the server apparatus (the combination control server) that controls the combined operation of the device control servers stops, the server apparatus can be prevented from monopolizing the device control servers and the electronic devices contained in the device control servers.

According to the present invention, scalability improves considerably even in a large-scale system.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium that stores therein a computer program causing a computer to execute a process comprising:
receiving, via a network, a device control service request for controlling a group of electronic devices;
obtaining a list of operable electronic devices, the list associating an owner of each electronic device with identification information of electronic devices of which a sender of the service request received has operating authority;
determining whether an owner associated with identification information of the group of electronic devices is identical to the sender of the service request by referring to the obtained list;
requesting, when the sender of the service request is identical to the owner of the group of electronic devices, issuance of operating authority transfer certificates for the electronic devices;
receiving an operating authority transfer certificate that is issued by a server when all of the electronic devices in the group are operable by the sender of the service request; and
transmitting the received operating authority transfer certificate and a plurality of requests to execute device control processes to respective device control servers for controlling an operation of the electronic devices in the group based on the service request.

2. The recording medium according to claim 1, wherein the network is a web service communication network.

3. The recording medium according to claim 1, wherein the process further comprises:
issuing, when all of the electronic devices in the group are operable by the sender of the service request, the operating authority transfer certificates for the electronic devices to the device control servers and to other server requesting issuance of the operating authority transfer certificates.

4. The recording medium according to claim 3, wherein the issuing includes issuing the operating authority transfer certificates to restrict the device control processes according to at least one of a specified time period and a specified operation of the electronic devices.

5. The recording medium according to claim 3, wherein the process further comprising:
comparing a first operating authority transfer certificate issued by the server and a second operating authority transfer certificate transmitted from the other server; and
performing the device control process according to a request to execute the device control process transmitted from the other server, when the first and second operating authority transfer certificates match.

6. A device control service providing system comprising:
a memory storing executable instructions,
a processor executing the instructions being configured to operate as:
a service request receiving unit that receives, via a network, a device control service request for controlling a group of electronic devices;
a determining unit that obtains a list of operable electronic devices, the list associating an owner of each electronic device with identification information of electronic devices of which a sender of the service request received has operating authority, determines whether an owner associated with identification information of the group of electronic devices is identical to the sender of the service request by referring to the obtained list, and requests, when the sender of the service request is identical to the owner of the group of electronic devices, issuance of operating authority transfer certificates for the electronic devices; and
a process execution requesting unit that transmits the operating authority transfer certificate and a plurality of requests to execute device control processes to respective device control servers for controlling an operation of the electronic devices in the group based on the service request, the operating authority transfer certificate issued when all of the electronic devices in the group are operable by the sender of the service request.

7. The device control service providing system according to claim 6, wherein the network is a web service communication network.

8. The device control service providing system according to claim 6, wherein the processor is further configured to operate as
a process allocating unit that allocates processes to receive the service requests, and processes to request execution of the device control processes, based on loads of server apparatuses, wherein
the server apparatus includes the service request receiving unit and the process execution requesting unit.

9. The device control service providing system according to claim 6, wherein the processor is further configured to operate as
an issuing unit that issues the operating authority transfer certificates for the electronic devices to the device control servers and to the process execution requesting unit, when all of the electronic devices in the group are operable by the sender of the service request, wherein
each of the device control servers comprises
a comparing unit that compares a first operating authority transfer certificate issued by the issuing unit and a second operating authority transfer certificate transmitted from the process execution requesting unit, and
a processing unit that performs the device control processes according to a request transmitted by the process execution requesting unit, when the first and second operating authority transfer certificates match.

10. The device control service providing system according to claim 9, wherein
the issuing unit issues the operating authority transfer certificates to restrict the device control processes according to at least one of a specified time period and a specified operation of the electronic devices.

11. A method that provides device control service for controlling operation of electronic devices, the method comprising:

receiving, via a network, a device control service request for controlling a group of the electronic devices;
obtaining a list of operable electronic devices, the list associating an owner of each electronic device with identification information of electronic devices of which a sender of the service request received has operating authority;
determining whether an owner associated with identification information of the group of electronic devices is identical to the sender of the service request by referring to the obtained list;
requesting, when the sender of the service request is identical to the owner of the group of electronic devices, issuance of operating authority transfer certificates for the electronic devices;
receiving an operating authority transfer certificate that is issued by a server when all of the electronic devices in the group are operable by the sender of the service request; and
transmitting the received operating authority transfer certificate and a plurality of requests to execute device control processes to respective device control servers for controlling an operation of the electronic devices in the group based on the service request.

12. The method according to claim 11, wherein the network is a web service communication network.

13. The method according to claim 11, further comprising:
issuing, when all of the electronic devices in the group are operable by the sender of the service request, the operating authority transfer certificates for the electronic devices to the device control servers and to other server requesting issuance of the operating authority transfer certificates;
comparing a first operating authority transfer certificate issued by the server and a second operating authority transfer certificate transmitted from the other server; and
performing the device control processes according to a request to execute the device control process transmitted from the other server, when the first and second operating authority transfer certificates match.

* * * * *